United States Patent
Malik et al.

[11] Patent Number: 6,160,794
[45] Date of Patent: Dec. 12, 2000

[54] METHOD AND SYSTEM TO OBTAIN TEST INFORMATION REGARDING AN ADVANCED SERVICE IN A TELECOMMUNICATIONS SYSTEM

[76] Inventors: Dale W. Malik, 1035 Redfield La., Atlanta, Ga. 30338; Robert A. Koch, 6085 Courtside Dr., Norcross, Ga. 30092

[21] Appl. No.: 08/967,071

[22] Filed: Nov. 10, 1997

[51] Int. Cl.[7] .............................. G06F 11/00; H04J 3/12; H04M 1/56
[52] U.S. Cl. ............................. 370/244; 370/522; 379/142
[58] Field of Search ..................... 370/241, 244, 370/250, 522, 242; 379/142

[56] References Cited

U.S. PATENT DOCUMENTS

| | | | |
|---|---|---|---|
| 5,278,894 | 1/1994 | Shaw | 379/142 |
| 5,283,824 | 2/1994 | Shaw | 379/142 |
| 5,497,414 | 3/1996 | Bartholomew | 379/142 |
| 5,521,969 | 5/1996 | Paulus et al. | 379/142 |
| 5,590,184 | 12/1996 | London | 379/142 |
| 5,784,444 | 7/1998 | Snyder et al. | 379/142 |
| 5,799,060 | 8/1998 | Kennedy et al. | 379/142 |
| 5,859,902 | 1/1999 | Freeman | 379/142 |
| 5,901,209 | 5/1999 | Tannenbaum et al. | 379/142 |
| 5,903,636 | 5/1999 | Malik | 379/142 |

*Primary Examiner*—Chau Nguyen
*Assistant Examiner*—Phuongchau Ba Nguyen
*Attorney, Agent, or Firm*—Nora M. Tocups, Esq.; James L. Ewing, IV, Esq.; Kilpatrick Stockton LLP

[57] ABSTRACT

A method and system to obtain test information regarding an advanced service in a telecommunications system. A communication associated with identification information including a test indicator such as a test calling line number is received. The processing of the communication is paused while instructions are obtained regarding an advanced service. In obtaining instructions, the test indicator is recognized. In response to the recognition, test information is obtained regarding the advanced service. The test information is associated with the communication and may be substituted for the test indicator in the identification information. After association, the processing of the communication is resumed so that the advanced service is applied to the communication. In particular, the communication is routed with the test information through the telecommunications system. The test information may be displayed on a calling line ID unit or otherwise obtained at a terminating unit.

22 Claims, 2 Drawing Sheets

METHOD AND SYSTEM TO OBTAIN TEST INFORMATION REGARDING AN ADVANCED SERVICE IN A TELECOMMUNICATIONS SYSTEM

TECHNICAL FIELD

The present invention relates to telecommunications systems, and more particularly, relates to the testing of telecommunications systems. Even more particularly, the present invention relates to the testing of telecommunications systems so as to obtain test information regarding the provision of an advanced service to a communication.

BACKGROUND OF THE INVENTION

Modern telecommunications systems are operated in connection with sophisticated computer networks and typically include Advanced Intelligent Network (AIN) architecture. These telecommunications systems provide numerous advanced services to the customer in a fast, efficient, and largely transparent manner. Generally, an advanced service is a service that provides features or functions that are not usually provided within a local switching system (e.g., #5ESS, manufactured by Lucent Technologies, Inc.). Also, generally, an advanced service is a service that provides features or functions that are relatively complex, that require coordination of multiple systems, and that are implemented typically through the use of data communications between or among network elements. Examples of advanced services include audio caller identification, call forwarding, and advanced services offered by BellSouth Corporation such as Adwatch[SM] service and CrisisLink[SM] service.

In the process of developing and supporting advanced services, the testing and trouble-shooting of these advanced services is critical to ensure proper operation. Prior to implementation of an advanced service, it must be tested to determine if the advanced service will perform as desired in the telecommunications system. When an implemented advanced service is not performing as desired, then trouble-shooting steps must be taken to determine the reason for such lack of performance.

A method of testing and trouble-shooting an advanced service is to place a test call that invokes the advanced service from a test calling line to another test calling line. For example, both of these test calling lines may be located in the same place or laboratory so as to facilitate obtaining test results. By this method, certain aspects of the advanced service may be tested. For example, this method may accomplish the testing of announcement prompts, completion of the call to the other test line, or termination of the call to a busy tone or to a termination announcement.

However, other aspects of the advanced service cannot be tested by this method of simply placing a test call from a test calling line to another test calling line. These other aspects cannot be tested by this method because these other aspects are generally transparent to the person or entity placing or receiving the test call. These other aspects are the "behind-the-scenes" details that are involved in setting up and routing the test call through the telecommunications system and that are involved in the provision or application of the advanced service to the test call. Because these behind-the-scenes details are transparent to the person or entity placing or receiving the test call, these details are referred to herein as transparent data.

Generally, transparent data is transparent to the person or entity making or receiving a call because the transparent data is passed in signaling messages with the call or is recorded for other uses such as billing or measurements without being available to the person or entity making or receiving the call. Transparent data may be classified generally into one of three groups of data relating to a call that is routed through a telecommunications system and to which an advanced service is applied. These three groups of data include: network data; application data; and subscriber data. Network data includes the data that is exchanged between and among network elements in the routing or processing of a call through the telecommunications system. For example, network data may include privacy indicator, billing parts number, carrier code, trigger type, subsystem, originating print code (OPC), destination point code (DPC), and translation type. Network data may be considered ephemeral in that it is used as needed to process or route a call through the network. But after the network data has served its purpose in such processing or routing, the network data generally disappears without a trace. In other words, network data appears as needed and disappears when its usefulness is at an end. Usually, it is impossible to track and review such network data after the call has been processed through the telecommunications system because no record of the network data is made or stored. Thus, network data truly fits the definition of transparent data.

Application data includes the data that is exchanged between and among network elements with respect to the provision or application of an advanced service to a call. For example, application data may include timers, default routing, data variables, announcement types, and passwords (system level). Like network data, application data also may be ephemeral in that it is created as necessary and disappears when its usefulness is at an end. Also like network data, application data generally is impossible to track and review after the advanced service has been provided to the call because no record of the application data is made or stored. Thus, further like network data, application data truly fits the definition of transparent data.

Subscriber data includes the data that is stored or otherwise used in connection with telecommunication services including advanced services to a particular subscriber. For example, subscriber data may include preferred carrier, preferred routing, preferred billing, and screening information. Unlike network data and application data, subscriber data may be stored and recorded in association with other records pertaining to a subscriber. Nevertheless, subscriber data is typically unavailable to a person or entity placing or receiving a test call, and thus, subscriber data fits within the definition of transparent data.

In sum, the method of simply placing a test call from a test calling line to another test calling line cannot serve as a mechanism to test or trouble-shoot an advanced service with respect to transparent data that is involved in the application of the advanced service to a call. This method cannot serve as such a test mechanism because the transparent data is unavailable to the person or entity placing the call or the person or entity receiving the call. For example, the person placing a test call does not have access to network, application or subscriber data that may be generated or recorded in the process of the provision of an advanced service to the test call.

To obtain the transparent data that may be generated or recorded in the provision of an advanced service to a test call, the only method heretofore available is a case by case review of the appropriate software or hardware involved in the passing of the transparent data in signaling messages or recording of the transparent data such as in billing or other measurements. The review of the appropriate software or hardware involves the use of sophisticated debugging programs and systems. Thus, a person who is testing or trouble shooting an advanced service and desires to review the transparent data that is generated or recorded in the provision of the advanced service must learn to use and then implement a sophisticated debugging program as appropriate to each type of transparent data that is to be reviewed. It takes a lot of time and effort to conduct such a review of transparent data, and it takes a significant amount of skill on the part of the person to carry out such an intensive review.

By way of example, the testing of a new advanced service or the trouble shooting of an implemented advanced service is usually performed by a technician with programming experience. To test or trouble shoot an advanced service, the technician accesses the appropriate network element through a workstation. The technician sets traces on the communications to which the advanced service is applied and receives a debugging record with respect to each such communication. The technician then deciphers the error codes in the debugging record to determine the particular communications of interest. The technician attempts to correct any problems, and then the technician repeats these described testing procedures to verify that the attempted corrections had proved successful.

This example demonstrates that the testing of a new advanced service or the trouble shooting of an implemented advanced service with respect to transparent data has been limited to skilled individuals with access to sophisticated debugging programs and equipment. In other words, there is no method or system that a subscriber could use to check information with respect to an advanced service to which the subscriber subscribes and which information is included in transparent data.

Further, the testing of a new advanced service or the trouble shooting of an implemented advanced service with respect to transparent data has been an intensive activity in terms of time and effort for the person conducting the tests or trouble-shooting. Even when such testing or trouble-shooting has been conducted, the test information is obtained on a delayed basis. In other words, real-time testing or trouble shooting has been impossible because the appropriate software records have to be obtained and reviewed with respect to the desired transparent data. The lack of real-time testing or trouble shooting for transparent data of an advanced service slows the overall testing and implementation of a new advanced service and slows the corrections to an implemented advanced service with problems.

Finally, these problems with the testing or trouble shooting for transparent data involved in the provision of an advanced service negatively affect the design, implementation, and maintenance of advanced services in a telecommunications system, and ultimately, negatively affect the competitive posture of the service provider that seeks to bring the advanced services to the telecommunications market.

Therefore, there is a need for a method and system that obtains test information regarding an advanced service in a telecommunications system.

In particular, there is a need for a method and system that obtains test information with respect to transparent data that is generated in connection with the provision of an advanced service to a call as the call is routed or processed through the telecommunications system.

More particularly, there is a need for such a method and system that obtains such test information on a real-time basis.

Even more particularly, there is a need for such a method and system that obtains such test information in an efficient, simple, and cost effective manner without the use of complex equipment or sophisticated debugging programs.

Yet even more particularly, there is a need for a method and system that allows a subscriber to obtain such test information so as to check information with respect to an advanced service to which the subscriber subscribes and which information is included in transparent data.

SUMMARY

The present invention solves the problems of the prior art by providing methods and systems for obtaining test information regarding an advanced service in a telecommunications system. By obtaining this test information in a quick, efficient and accurate manner, the development and support of advanced services in telecommunications systems are furthered. In addition, the present invention provides methods and systems to obtain transparent data as test information. Heretofore, this transparent data was unavailable to a person or entity placing or receiving a test call in association with an advanced service in a telecommunications system. In particular, transparent data such as network data, application data and/or customer data may be obtained through the methods and system of the present invention. Further, this transparent data may be obtained through the use of the calling party address field (or other field) of the identification information that is associated with a communication as an advanced service is applied to the communication and the communication is processed through the telecommunications system. This transparent data then may be displayed in place of the calling party address information typically displayed on a calling line ID display unit or received at some other device such as a computer.

Generally stated, the present invention includes a method and system such that a communication that is received in the telecommunications system is associated with identification information including a test indicator. For example, the test indicator may be a test calling line number. Based on the identification information, the processing of the communication is paused while call processing instructions are obtained with respect to the application of an advanced service to the communication. In the course of obtaining the call processing instructions, the test indicator included in the identification information is recognized. For example, a service package application (SPA) may be predisposed to recognize the test indicator in the identification information.

In response to the recognition of the test indicator, test information is obtained with respect to the advanced service to be applied to the communication. Alternatively, in response to the recognition of the test indicator, an exchange of information may be conducted with the calling party with respect to the determination of type or types of test information that may be obtained. For example, an announcement may be played to the communication announcing the plurality of types of test information, and a signal may be received from the communication with the signal indicating the type of test information from amongst the plurality of types of test information that is to be obtained. The test information is associated with the communication. For example, the test information may be substituted for the test indicator in the identification information associated with the communication.

After association of the test information with the communication, the processing of the communication then is resumed pursuant to the call processing instructions so that the advanced service is applied to the communication. In particular, the communication is routed with the test information through the telecommunications network. By this method and system, test information with respect to the advanced service applied to the communication is obtained based on the recognition of the test indicator associated with the communication. The test information may be displayed or otherwise obtained at the terminating unit or its connected devices where the communication is terminated.

Therefore, it is an object of the present invention to provide a method and system that obtains test information regarding an advanced service in a telecommunications system.

In particular, it is an object of the present invention to provide a method and system that obtains test information with respect to transparent data that is generated in connection with the provision of an advanced service to a call as the call is routed or processed through the telecommunications system.

More particularly, it is also an object of the present invention to provide a method and system that obtains such test information on a real-time basis.

Even more particularly, it is another object of the present invention to provide a method and system that obtains such test information in an efficient, simple, and cost effective manner without the use of complex equipment or sophisticated debugging programs.

Yet even more particularly, it is an additional object of the present invention to provide a method and system that allows a subscriber to obtain such test information so as to check information with respect to an advanced service to which the subscriber subscribes and which information is included in transparent data.

DETAILED DESCRIPTION

Figure 1:
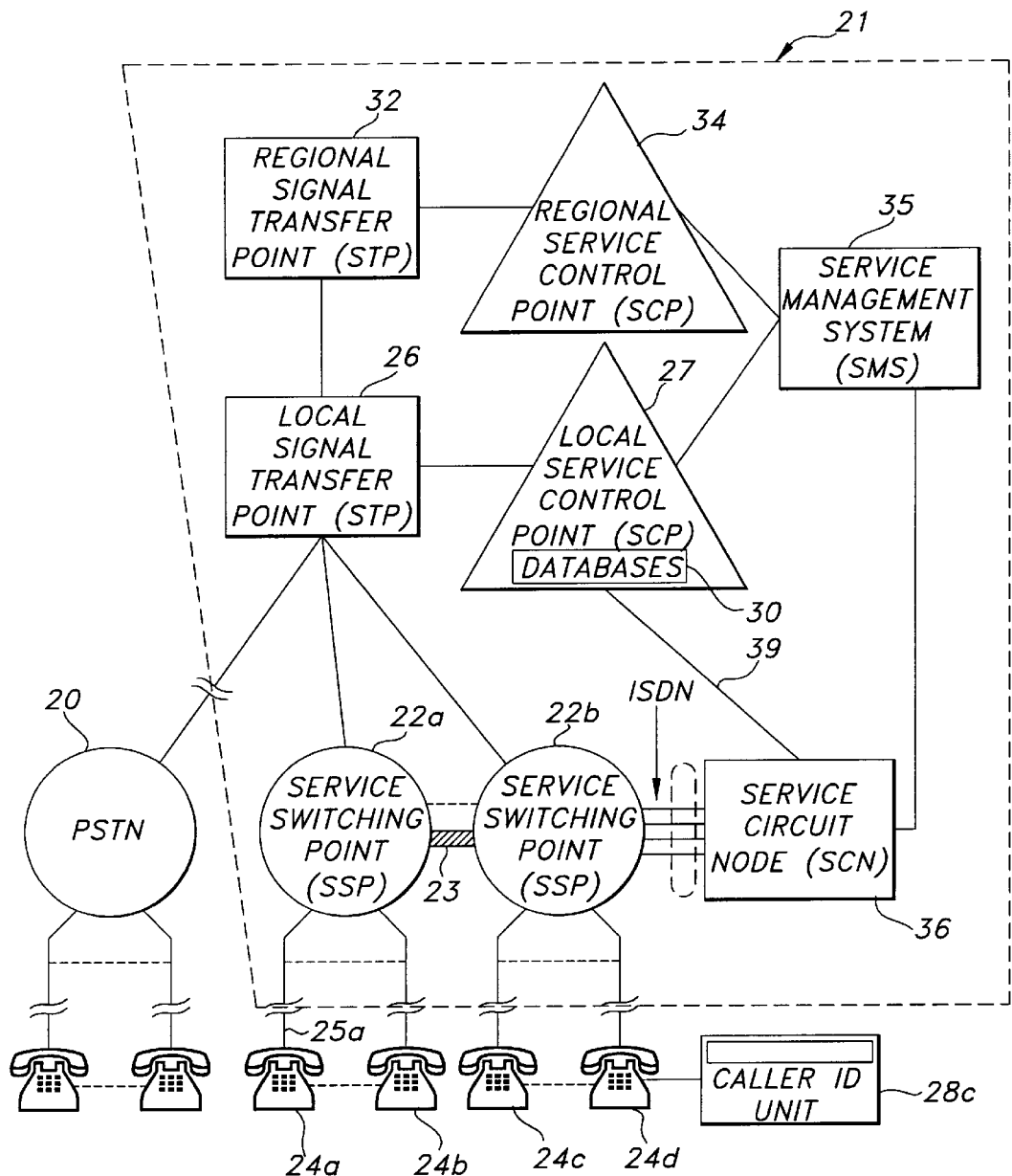
FIG. 1 is a diagram of an exemplary embodiment and exemplary environment for operation of the present invention.

The present invention includes methods and systems for obtaining test information regarding an advanced service as applied to a communication in a telecommunications system. The particular embodiments described herein are intended in all respects to be illustrative rather than restrictive. Alternative embodiments will become apparent to those skilled in the art to which the present invention pertains without departing from its spirit and scope.

This detailed description first provides a general statement of the present invention. Then, with reference to FIG. 1, this detailed description provides an overview of an exemplary environment for implementation of embodiments of the present invention. The overview of the exemplary environment is followed by a description of the operation of an exemplary embodiment with reference to a timing diagram as illustrated in FIG. 2.

In addition, the reader is advised that throughout the drawings, like numerals indicate like elements.

General Statement of the Present Invention

The present invention includes methods and systems for obtaining test information regarding an advanced service as applied to a communication in a telecommunications system. The test information may include the transparent data referenced above that generally includes network data, application data, and customer data. The test information is obtained through the call processing associated with application of an advanced service to a communication routed through the telecommunications system.

In particular, the communication is received in the telecommunications system and the communication is associated with identification information including a test indicator. Based on the identification information, the processing of the communication is paused while call processing instructions are obtained with respect to the application of an advanced service to the communication. In the course of obtaining the call processing instructions, the test indicator included in the identification information is recognized. For example, a service package application (SPA) may be predisposed to recognize the test indicator in the identification information. In response to the recognition of the test indicator, test information is obtained with respect to the advanced service to be applied to the communication. The test information is associated with the communication. For example, the test information may be substituted for the test indicator in the identification information associated with the communication.

After association of the test information with the communication, the processing of the communication then is resumed pursuant to the call processing instructions so that the advanced service is applied to the communication. In particular, the communication is routed with the test information through the telecommunications network. By this method and system, test information with respect to the advanced service applied to the communication is obtained based on the recognition of the test indicator associated with the communication. The test information may be displayed or otherwise obtained at the terminating unit or its connected devices where the communication is terminated.

Figure 2:
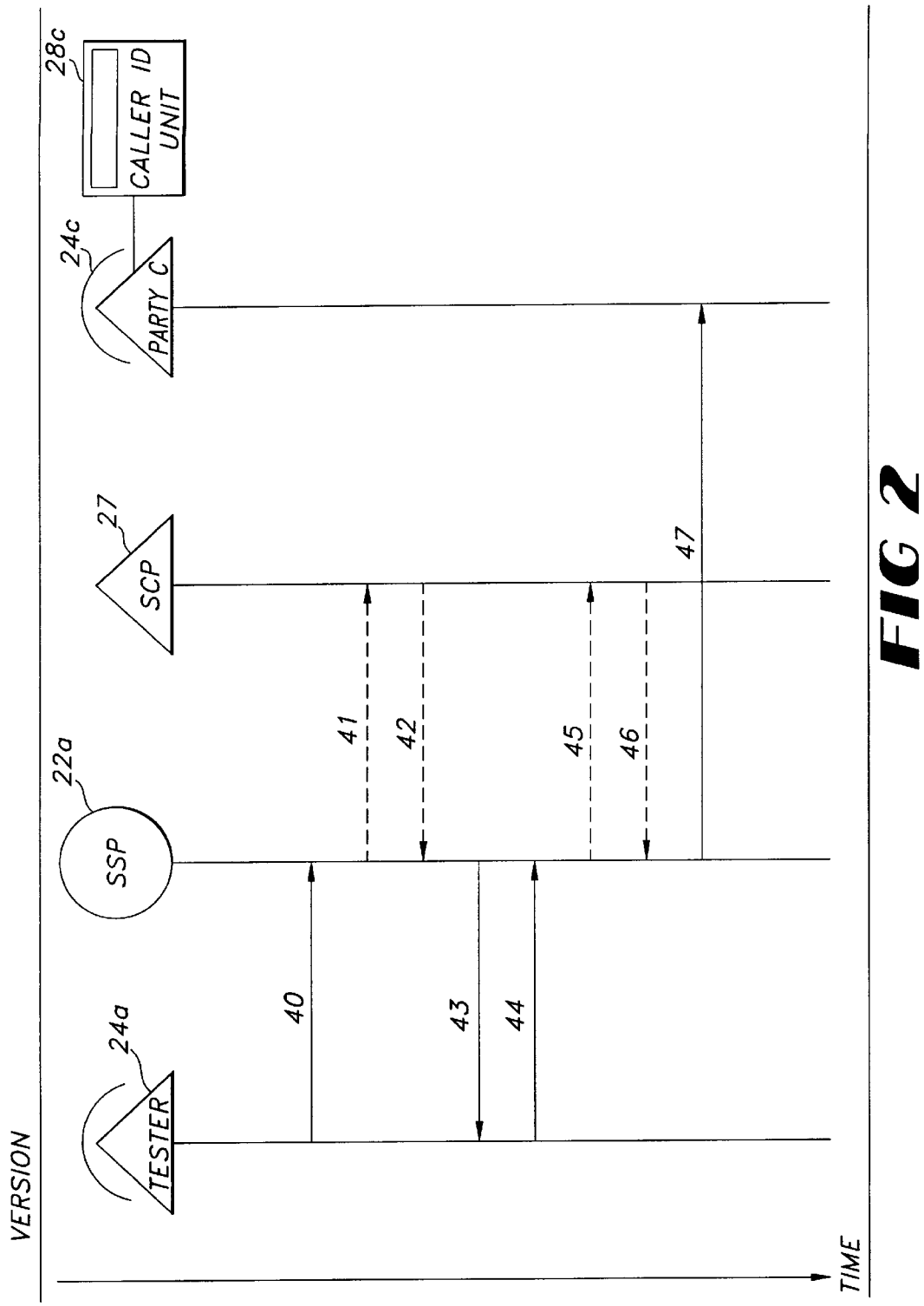
FIG. 2 is a timing/block diagram illustrating an exemplary method and system of operation of the present invention.

Overview of an Exemplary Environment—FIG. 1

FIG. 1 is a diagram of an exemplary embodiment and exemplary environment for operation of the present invention. Connected to the public switched telecommunication network (PSTN) 20 an exemplary environment is an Advanced Intelligent Network (AIN) 21. For brevity, only a basic explanation of the AIN 21 is provided herein. Where the AIN 21 operates or is composed differently in an important aspect from that which would be understood by those skilled in the art, additional details are provided herein. For further information regarding the referenced AIN 21 and aspects thereof, the interested reader is referred to the patent to Weisser, U.S. Pat. No. 5,430,719, which is incorporated herein by reference.

The AIN 21 includes a variety of interconnected network elements. A group of such network elements includes the plurality of central offices which are indicated as service switching points (SSPs) 22a, 22b in FIG. 1. An SSP typically includes switch functionality, but also includes other functionality so as to communicate with other AIN elements as those skilled in the art understand. As further illustrated in FIG. 1, the SSPs 22a, 22b have a plurality of subscriber lines connected thereto. A subscriber line may also be referred to as a calling line. Each SSP serves a designated group of calling lines, and thus, the SSP that serves a particular calling line may be referred to as its serving SSP. Each calling line is connected typically to a piece of terminating equipment including a plurality of telephones commonly referenced as 24 and individually referenced as 24a, 24b, 24c and 24d. Although telephones are illustrated as the pieces of terminating equipment in FIG. 1, those skilled in the art will understand that such pieces include other devices such as facsimile machines, computers, modems, etc. In addition, a caller identification (ID) unit 28c is illustrated as connected to telephone 24d. Alternatively, the terminating equipment may have data receipt capability such as an analog display service interface compatible telephone, or a computer functionally connected to the telephone.

Pursuant to the preferred embodiment, each active calling line in an AIN is assigned a ten digit calling line number. A calling line number is commonly referred to as a telephone number or a directory number. In the description of the present invention, the term "calling line number" is used in its generally understood meaning to be the number which is associated with the calling line on which the call originates. The term "calling line number" is used synonymously, unless indicated, with the following terms: calling party address, calling party number. Sometimes the term "calling line number" is abbreviated as "calling line". The term "dialed calling line number" is used in its generally understood meaning to be the number which is dialed or input by a caller or source to reach a piece of terminating equipment on a calling line associated with the dialed calling line number. The term "dialed calling line number" is used synonymously, unless indicated, with the following terms: called line number, called party address or called party number.

Referring again to FIG. 1, SSPs 22a, 22b are interconnected by a plurality of trunk circuits 23. These are the voice path trunks that interconnect the SSPs to connect communications. The term "communication" or "call" is used herein to include all messages that may be exchanged between caller and called party in the network illustrated in FIG. 1.

Each of the SSPs 22a, 22b is connected to another type of AIN element referred to as a local signal transfer point (STP) 26 via respective data links. Currently, these are data links employing a signaling protocol referred to as Signaling System 7 (SS7), which is well known to those skilled in the art. Much of the intelligence of the AIN resides in yet another type of AIN element referred to as a local service control point (SCP) 27 that is connected to STP 26 over an SS7 data link. Among the functions performed by the SCP 27 is the maintenance of network databases and subscriber databases as represented collectively by databases 30. These databases may be used in providing advanced services to a customer. Typically, the SCP 27 is also the repository of service package applications (SPAs) that are used in connection with or as part of the databases 30 in the application of advanced services or enhanced features to calling lines.

As used herein, the phrase "advanced services" refers to features or enhancements that are provided by a telecommunication service provider to a customer in addition to conventional telephone service through the PSTN. Referring again to FIG. 1, the local STP 26 may be connected to other network elements through a regional STP 32, which in turn, may be connected to a regional SCP 34. Both regional SCP 34 and local SCP 27 are connected via respective data links to a service management system (SMS) 35. The SMS 35 interfaces to business offices of the local exchange carrier and interexchange carriers.

In order to keep the processing of data and calls as simple as possible, a relatively small set of triggers is defined at the SSPs. A trigger in the AIN is an event associated with a particular calling line that generates a query packet to be sent to an SCP. The trigger causes the SCP to query its databases or service package applications for processing instructions with respect to the particular call. The results are sent back to the SSP in a response packet from the SCP 27 through STP 26. The response packet includes instructions to the SSP as to how to process the call. The instructions may be to take some special action as a result of an advanced service or enhanced feature. In response, the SSP moves through its call states, collects the called digits, and generates further packets that are used to set up and route the call. Similar devices for routing calls among various local exchange carriers are provided by regional STP 32 and regional SCP 34.

As illustrated in FIG. 1, the AIN 21 also includes a service circuit node 36 (SCN), which may also be referred to herein as a service node (SN). SCN 36 includes voice and dual tone multi-frequency (DTMF) signal recognition devices and voice synthesis devices. SCN 36 is connected to the local SCP 27 via data link 39 using an X.25 protocol and to the SMS 35 via a data link. In addition, SCN 36 typically is connected to one or more (but usually only a few) SSPs via Integrated Service Digital Network (ISDN) links as shown by the connection to SSP 22b.

Exemplary Operation—FIG. 2

FIG. 2 is a timing/block diagram illustrating an exemplary method and system of operation of the present invention. The exemplary method and system are described by way of an example of obtaining test information with respect to call processing associated with application of an advanced service through use of a communication routed through the telecommunications network. In particular, the example includes a telecommunications service package application (SPA) that is predisposed to recognize identification information associated with a call as including a request for test information. The SPA also is predisposed to recognize certain signals as specifying the type of test information that is desired. In addition, the SPA is predisposed to extract, assemble and deliver the desired test information in a manner that may be specified by the entity seeking the test information. The example includes a "tester" as the entity who seeks test information that pertains to some aspect of a telecommunications service. In particular, in the example, the tester seeks the value of the carrier code that is used in connection with processing a call that is redirected by an AIN redirection service from a called party (party B) to a forwarded party (party C).

Initiation of the Test Call

Referring to FIG. 2, the tester 24a initiates the test by placing a call from a telephone 24a having a calling line number that has been predefined as a test calling line number. In this case, the line on which the call originates is referred to as the test calling line. As noted, the calling line number has been predefined as a test calling line number. This predefinition provides that the test calling party number is preferably recognized by certain network elements in the processing of the call as a test indicator. For example, a service package application (SPA) that is used in the provision of an advanced service may be predisposed to recognize the predefined test calling line number as a test indicator when the predefined test calling line number is included in the identification information associated with the call. In response to this recognition of the test calling party number as a test indicator, network elements take certain steps to obtain test information as is explained further below.

Advantageously, a subscriber's calling line number may be predefined as a test calling line number so that the subscriber may take advantage of the methods and systems of the present invention to obtain test information regarding advanced services that may be applied to call originating or terminating to the subscriber's calling line.

Alternatively, the tester 24a may place a call from any telephone or calling line number to a preselected directory number. As a result of the call to the preselected directory number, a substitution is made in the identification information that is associated with the call. In particular, a test calling line number is substituted in the calling party address field for the calling line number from which the call is placed. In this alternative, the calling line number is not predefined as a test calling line number. But rather, as a result of the call to the preselected directory number, a calling line number that has been predefined as a test calling line number is substituted for the calling line number of the calling line on which the call originated. In particular, the predefined test calling line number is substituted in the identification information associated with the call for the calling line number in the identification information.

Advantageously, a subscriber may be provided with this preselected directory number mentioned in the immediately preceding paragraph so that the subscriber may take advantage of the methods and systems of the present invention to obtain test information regarding advanced services that may be applied to call originating or terminating to the subscriber's calling line.

In the example, the tester seeks test information relating to the processing of a call that is redirected by an AIN redirection service from party B to party C. Thus, the tester dials the directory number (e.g. 615-555-1234) of the telephone 24b of party B. This directory number is referred to hereinafter as the called party number. The call is initially processed from telephone 24a through the PSTN in a conventional manner until the call reaches the service switching point (SSP) 22a that serves the calling line 25b of telephone 24b, i.e., the called party number. The call includes identification information such as the calling party address and the called party address. In the example, the SSP 22a that serves party B's calling line 25b is the same SSP that serves calling line 25a. Those skilled in the art will understand that the SSP serving the called party's line need not be the same as the SSP serving the calling party's line. In FIG. 2, the processing of the call from telephone 24a through the PSTN to SSP 22a is indicated by arrow 40. The solid line in arrow 40 and other arrows indicates that the communication is carried over voice links rather than data links.

Pausing to Obtain Call Processing Instructions

In this example, party B has activated his or her redirection or call forwarding service. As a result of this activation, SSP 22a is preferably provisioned with a trigger with respect to calls that are received for party B's directory number (615-555-1234). Thus, in response to the identification information associated with the communication, i.e., party B's directory number as the called party address, the SSP 22a initiates a query/response exchange with SCP 27. In other words, the SSP 22a pauses in the processing of the call to request instructions for further call processing instructions. In this example, these call processing instructions relate to the application of an advanced service, i.e., the redirection service, to the communication. As indicated by arrow 41, this request for instructions preferably takes the form of a query from SSP 22a to SCP 27. The dashed line in arrow 41 and other arrows indicates that the medium is a data link rather than a voice link and that the information exchange is a data exchange.

As part of the SSP's query to the SCP 27 for call processing instructions, the SSP 22a provides the SCP 27 with identification information associated with the call. In particular, the SSP 22a provides the SCP 27 with the calling party number, which in this example, is the test calling party number. In response to receiving the query from the SSP 22a, the SCP 27 carries out certain functions in connection with the appropriate service package application(s) (SPAs). The SCP 27 looks up the called party number and finds that the SPA relating to redirection service is to be consulted with respect to the call. In the illustrated example, the SPA relating to redirection service provides information that the call is to be redirected to the calling line number 25c of called party C at the directory number of 704-555-1234.

Recognition of the Test Indicator

In addition, as noted above, the SPA has been predisposed to recognize when a call includes a request for test information. In particular, the service package application (SPA) is predisposed to make a recognition of a test indicator in the identification information which is provided to the SPA. This predisposition may take the form of programming the SPA to make this recognition and to respond as is explained below. In this example, the SPA recognizes that the call from the tester includes a request for test information. Preferably, the SPA makes this recognition on the basis of an indication in the form of the presence of the test indicator, i.e., the test calling party number, in the identification information associated with the call, and in particular, in the calling party address field of the identification information or query package. In other words, the presence of the test calling party number in the identification information flags the call as including a request for test information. Of course, if there is no test indicator that a call includes a request for test information, then the SPA proceeds as it would normally in the application of the redirection service.

As noted, in this example, the test indicator is the presence of the test calling party number in the calling party address field of the identification information or query package. The presence of the test calling party number in the calling party address field has certain advantages over the other fields of the identification information or query package. One of these advantages is that the test information may be substituted for the test indicator in the calling party address field. Then, the test information may be displayed at the terminating unit in the same manner as a calling line identification may be displayed at the terminating unit. Alternatively, or in addition thereto, the called party address field or other field included in identification information associated with a call may include the test indicator or an additional test indicator.

Obtaining the Test Information

Having determined that the call includes a request for test information, the SPA responds by obtaining test information with respect to the advanced service to be applied to the communication. Preferably, the SPA is predisposed to obtain test information that corresponds to the test indicator. This predisposition may take the form of programming the SPA to obtain such test information. As is explained in greater detail in the sub-sections below, the test information (or types of test information) may be obtained: (1) automatically in response to a particular test indicator; or (2) after a determination of the test information (or types of test information) which the calling party may be seeking.

Automatically Obtaining the Test Information Redirection Service Example

Referring to the example of the redirection service, the SPA is predisposed to recognize certain signals (such as the calling party address, i.e., the test calling line number) as specifying the type of test information that is desired. In this example, the SPA relating to redirection service is predisposed to recognize the calling party address (i.e., the test calling line number) as indicating that the type of test information that is sought is the value of the carrier code that is used in connection with processing a call that is redirected by the redirection service from a party B to another party. The SPA is further predisposed to extract, assemble and deliver the desired test information. In this example, the SPA automatically may obtain the test information that corresponds to the value of the carrier code that is used in connection with processing a call that is redirected by the redirection service from party B to another party. Preferably, this test information is delivered in substitution for the test calling line number in the calling party address field of the identification information associated with the call. In other words, the test information is associated with the communication in place of the test indicator, i.e., the test calling line number. Thus, as indicated by arrow 46, this test information is delivered in a data packet from the SCP 27 to SSP 22*a*. In addition to this test information, the SCP 27 provides the call processing instructions to the SSP 22*a*, and in this example, includes instructions that the call be redirected to calling party C.

Test Indicator Corresponding to Encoded Data

As noted above, the SPA preferably is predisposed to automatically obtain test information that corresponds to the test indicator recognized in the identification information of the call. The SPA may be predisposed to recognize a particular test indicator and to automatically obtain a certain type or types of test information in response to that particular test indicator. In the preferred embodiment, the test indicator is included in the calling party address field of the identification information. The calling party address field allows for the display of ten (10) digits on a calling line ID device, but the calling party address field may include up to as many as fifteen (15) digits. Thus, up to as many as fifteen digits may be configured in any of many forms to obtain different combinations of test information with ten digits being available if the test information is to be displayed and up to fifteen digits otherwise being available for transmission of the test information.

For example, assume that the SPA of the example is predisposed to obtain or provide four types of test information based on the recognition of particular test indicator. These exemplary four types of test information include: 1st type—personal identification number entered by caller; 2nd type—level of the per-call charge to associate with the call; 3rd type—the nature of the call as local, intra-LATA toll, or interLATA toll; and 4th type—carrier code. Each of these types of test information are preferably represented by a code, and thus, the test information obtained in this manner may be referred to as encoded data. In this example, the SPA is predisposed to obtain the four different types of test information and populate that test information in the calling party address field as follows: first three digits as corresponding to and indicating the 1st type of test information; fourth and fifth digits as corresponding to and indicating the second type of test information; sixth and seventh digits as corresponding to and indicating the third type of test information; and eighth, ninth and tenth digits as corresponding to and indicating the fourth type of test information.

In this example, the first three digits of the calling party address are replaced by the SPA with a three digit personal identification number (PIN) entered by the calling party. The fourth and fifth digits of the calling party address are replaced by two digit code that indicates the level of the per-call charge that is associated with the call. The sixth and seventh digits are replaced by a two digit code representing the nature of the call as local, intra-LATA toll, or interLATA toll. The eighth, ninth and tenth digits are replaced by three digits representing the carrier code that represents the carrier that is used in the application of the redirection service to the call. Table I illustrates how the calling party address may be used to include the codes representing four types of test information.

TABLE I

|  | 1st type PIN | 2nd type CHARGE | 3rd type NATURE | 4th type KIC |
|---|---|---|---|---|
| Ten digits of calling party number = | 373 | 99 | 01 | 333 |

Of course, those skilled in the art will recognize, the SPA (or other network device as appropriate) may be predisposed to recognize another particular test indicator. In response to this other particular test indicator, the SPA may be predisposed automatically to extract, assemble and deliver a different combination of codes representing respectively different types of test information than explained above.

Exemplary Use of Context Identifier

Another manner in which the SPA may be predisposed to automatically extract, assemble and deliver test information relates to the use of a context identifier. In response to another particular test indicator, the SPA may be predisposed to include or add a context identifier in the calling party address when the SPA returns the calling party address in the identification information to the SSP. This may mean that the calling party address field includes eleven rather then ten digits. This context identifier may be a piece of encoded data in that the context identifier represents information with respect to the call. In the example of the redirection service, the SPA may be predisposed to add a context identifier to the calling party address to indicate whether the calling party address represents the calling party's line number or whether the calling party address represents the directory number from which the call was redirected. In particular, when the SPA recognizes the test indicator in the identification information associated with the call, the SPA may add a "1" to the calling party address when the calling party address represents the calling party's line number, and the SPA may add a "2" to the calling party address when the calling party address represents the directory number from which the call was redirected. The recipient of this test information then gains the knowledge as to which of the two calling line numbers (the calling party's line number or the directory number from which the call was redirected) is being displayed on the calling line ID unit to which the call terminates. Of course, this eleventh digit representing the context identifier will not appear on typical calling line ID units because they only display ten digits. But the eleventh digit may be read by another device such as a computer to which the test information may be provided.

Determination of the Type of Test Information that Is Sought

In another exemplary embodiment, the SPA may not automatically obtain a certain type or types of test information in response to recognizing a test indicator in the identification information. Instead, the SPA may be predisposed to first determine what type or types of test information are being sought by the tester. As noted above, test information typically includes transparent data such as network data, application data or customer data. There may be a plurality of types of such test information. For example, these types of test information may include an identification of the charge party station type; alternate billing number(s); carrier codes; personal identification number(s); nature of the call; per-call billing rate; privacy indicator; or nature of dialed number as well as other types that will occur to those skilled in the art.

This determination with respect to the type or types of test information that are being sought by the tester is carried out preferably through an exchange of information with the tester. In particular, the SPA through SCP 27 responds to the query from the SSP 22a with a response to the SSP 22a as is indicated by arrow 42 in FIG. 2. This response may include instructions to the SSP 22a to play a particular announcement to the communication or to the tester or to otherwise obtain signals relating to the type of test information that is sought.

The SSP 22a follows these instructions and plays the particular announcement to the tester (or takes other appropriate steps) as is indicated by arrow 43 from SSP 22a to tester 24a. The particular announcement may include a menu or list of options relating to the test information. For example, one of these options may relate to obtaining the value of the carrier code that is used in the processing of communications that are redirected pursuant to the redirection service.

In response to the particular announcement (or other appropriate steps), the tester indicates the type of test information that is sought by inputting signals that correspond to the type of desired test information. These signals may be dual tone multi-frequency (DTMF) signals such as may be entered through a push-button telephone or other appropriate signals. In this example, the tester 24a inputs signals to indicate that the type of test information that is sought is the value of the carrier code that is used in connection with processing a call that is redirected by the redirection service from a party B to another party. As indicated by arrow 44, the signals are transmitted from the tester 24a to the SSP 22a, which, in turn, transmits the signals, as indicated by arrow 45, preferably in data form in a data packet, to the SCP 27, and in particular, to the SPA relating to the redirection service. The SPA then preferably extracts, assembles and delivers the test information or types of test information as determined in the exchange indicated by arrows 42, 43, 44 and 45 of FIG. 2. Preferably, this test information is delivered in substitution for the test calling line number in the calling party address field of the identification information associated with the call. In other words, the test information is associated with the communication in place of the test indicator, i.e., the test calling line number. Thus, as indicated by arrow 46, this test information is delivered in a data packet from the SCP 27 to SSP 22a. In addition to this test information, the SCP 27 provides the call processing instructions to the SSP 22a, and in this example, includes instructions that the call be redirected to calling party C.

Association of Test Information and Processing of the Communication

Referring still to FIG. 2, as is indicated by arrow 47, upon receipt of the response, the test information is associated with the communication. Preferably, this association is the inclusion of the test information in the calling party address field or parameter of the message that is used to further process the communication. After associating the test information with the communication, the processing of the communication continues pursuant to the call processing instructions so as to apply the advanced service to the communication and to route the communication with the test information through the telecommunications network. In this manner, test information with respect to the advanced service applied to the communication is obtained based on the recognition of the test indicator associated with the communication.

In particular, referring to the example, the SSP 22a provides for the processing of the call through the PSTN so as to redirect the call from party B to party C. The call is processed in a conventional manner with the exception that the test information is substituted preferably for the test calling line number in the identification information associated with the call. In this example, the test information is the value of party B's carrier code.

Generally, the call is processed so as to route the communication with the test information through the telecommunications network to a calling line connected to a terminating unit with a display device such as telephone 24c having the caller ID unit 28c. Upon receipt of the call and the identification information at the telephone 24c of party C, the test information is displayed on the caller ID unit 28c associated with the telephone 24c. In particular, the test information is displayed in substitution for the calling line identification that otherwise would be displayed on the unit. In this example, the value of party B's carrier code is displayed on the display of the caller ID unit 28c. The tester may have an associate read the test information displayed on the caller ID unit 28c and report that reading to complete the test.

Alternatively, the call may be processed so as to route the communication with the test information through the telecommunications network to a calling line connected to a terminating unit with a display device such as a computer with a display screen (not illustrated). Upon receipt of the call and the identification information at the computer, the test information is displayed on the display screen. This display may complete the test. As yet another alternative, the test information may be provided in the manner described to the computer, but the test information may not be displayed. Rather, the test information may be incorporated into a program or otherwise used in some diagnostic or other tool implemented with the computer.

Conclusion

Advantageously, the present invention includes methods and systems for obtaining test information regarding an advanced service as applied to a communication in a telecommunications system. The test information may include the transparent data referenced above that generally includes network data, application data, and customer data. The test information is obtained through the call processing associated with application of an advanced service to a communication routed through the telecommunications system. As another advantage, the present invention provides that the test information may be automatically provided or may be selected by a tester. As yet another advantage, the present invention provides that the test information may be obtained on the basis of the content of the calling party address in identification information associated with a call, and the test information may be transmitted in place of the calling party address information in that identification information. By such inclusion in the calling party address field of the identification information, the test information may be displayed on a calling ID display unit or provided to some other device which may be predisposed to retrieve the test information from that field.

This invention has been described in detail with particular reference to exemplary and preferred embodiments thereof. It will be understood that variations and modifications can be effected within the spirit and scope of the invention as described hereinabove and as defined in the appended claims.

We claim:

1. In a telecommunications system, a method to obtain test information with respect to call processing associated with application of an advanced service through use of a communication routed through the telecommunications network, comprising the steps of:

A. receiving a communication for processing through a telecommunications network, the communication being associated with identification information including a test indicator;

B. in response to the identification information, pausing the processing of the communication and obtaining call processing instructions with respect to application of an advanced service to the communication by using the identification information associated with the communication;

C. in the course of obtaining the call processing instructions, recognizing the test indicator included in the identification information associated with the communication;

D. in response to the test indicator, obtaining test information with respect to the advanced service to be applied to the communication;

E. associating the test information with the communication; and

F. after associating the test information with the communication, continuing the processing of the communication pursuant to the call processing instructions so as to apply the advanced service to the communication and to route the communication with the test information through the telecommunications network, whereby test information with respect to the advanced service applied to the communication is obtained based on the recognition of the test indicator associated with the communication.

2. The method of claim 1, wherein Step F comprises continuing the processing of the communication pursuant to the call processing instructions so as to route the communication with the test information through the telecommunications network to a calling line connected to a terminating unit with a display device; and the method of claim 1, further comprising the step of:

G. displaying the test information on the display device, whereby the test information is provided for display on the display device upon connection of the communication to the terminating unit.

3. The method of claim 1, wherein Step F comprises continuing the processing of the communication pursuant to the call processing instructions so as to route the communication with the test information through the telecommunications network to a calling line connected to computer, whereby the test information is provided to the computer upon connection of the communication to the computer.

4. The method of claim 1, wherein the test indicator comprises a test calling line number; and wherein Step A comprises receiving the communication associated with the identification information including the test calling line number.

5. The method of claim 4, wherein the communication is associated with the identification information including the test calling line number by originating from a test calling line associated with the test calling line number.

6. The method of claim 4, wherein the communication is associated with the test calling line number by having the test calling line number substituted for a calling line number associated with the communication based on origination of the communication on a calling line associated with the calling line number.

7. The method of claim 1, wherein the test information comprises a plurality of types of test information; and wherein Step D comprises, prior to obtaining the test information, determining a type of test information to be obtained from amongst the plurality of types of test information, and then obtaining the type of test information as the test information.

8. The method of claim 7, wherein the step of determining the type of test information to be obtained comprises the sub-steps of:

playing an announcement to the communication announcing the plurality of types of test information; and receiving a signal from the communication with the signal indicating the type of test information from amongst the plurality of types of test information.

9. The method of claim 1, wherein Step E of associating the test information with the communication comprises associating the test information with the communication in place of the test indicator.

10. In a telecommunications network wherein identification information associated with a communication is provided to a service package application (SPA) so as to obtain call processing instructions from the SPA with respect to the application of an advanced service to the communication, a method to provide test information with respect to the advanced service, comprising the steps of:

A. predisposing the service package application (SPA) to make a recognition of a test indicator in the identification information which is provided to the SPA;

B. causing the SPA, in response to the recognition of the test indicator, to obtain test information with respect to the advanced service; and C. causing the SPA, in response to obtaining the test information, to substitute the test information for the test indicator in the identification information, whereby the identification information associated with the communication includes the test information with respect to the advanced service as obtained by the SPA that provides the call processing instructions with respect to the advanced service.

11. The method of claim 10, further comprising the steps of:

D. after causing the SPA to substitute the test information for the test indicator in the identification information, continuing the processing of the communication through the telecommunications network to a calling line connected to a terminating unit with a display device; and E. displaying the test information on the display device, whereby the test information is provided for display on the display device upon connection of the communication to the terminating unit.

12. The method of claim 10, further comprising the step of:

D. after causing the SPA to substitute the test information for the test indicator in the identification information, continuing the processing of the communication through the telecommunications network to a calling line connected to a computer, whereby the test information is provided to the computer upon connection of the communication to the computer.

13. The method of claim 10, wherein the test information comprises a plurality of types of test information; and wherein Step B comprises, prior to obtaining the test information, causing the SPA to determine a type of test information to be obtained from amongst the plurality of types of test information, and then causing the SPA to obtain the type of test information as the test information.

14. The method of claim 13, wherein the step of causing the SPA to determine the type of test information to be obtained comprises causing the SPA to interact with a network element to obtain the type of test information from the communication.

15. The method of claim 14, wherein the step of causing the SPA to interact with the network element comprises the sub-steps of:

causing the SPA to instruct the network element
  to play an announcement to the communication announcing the plurality of types of test information;
  to receive a signal from the communication with the signal indicating the type of test information from amongst the plurality of types of test information, and
  to provide the signal to the SPA; and in response to receipt of the signal from the network element, causing the SPA to use the signal to obtain the type of test information as the test information.

16. In a telecommunications network, a system to obtain test information with respect to call processing associated with application of an advanced service through use of a communication routed through the telecommunications network, comprising:

A. a first network element being operative
  1. to receive a communication for processing through a telecommunications network, the communication being associated with identification information including a test indicator,
  2. in response to the identification information, to pause in the processing of the communication so as to obtain call processing instructions with respect to the communication, and
  3. to provide the identification information including the test indicator to a second network element so as to obtain the call processing instructions;

B. a second network element being operative
  1. to receive the identification information including the test indicator from the first network element,
  2. to recognize the test indicator associated with the communication,
  3. in response to the test indicator, to obtain test information with respect to the advanced service to be applied to the communication;
  4. to associate the test information with the identification information,
  5. to provide the call processing instructions with respect to the advanced service to be applied to the communication,
  6. to return the call processing instructions and the identification information including the test information to the first network element; and C. the first network element being operative
  1. to receive the call processing instructions and the identification information including the test information from the second network element,
  2. to associate the identification information with the communication, and
  3. to continue the processing of the communication pursuant to the call processing instructions so as to apply the advanced service to the communication and to route the communication with identification information including the test information through the telecommunications network, whereby test information with respect to the advanced service applied to the communication is obtained based on the recognition of the test indicator associated with the communication.

17. The system of claim 16, wherein the first network element is further operative to continue the processing of the communication pursuant to the call processing instructions so as to route the communication with the test information through the telecommunications network to a calling line connected to a terminating unit with a display device; and wherein the display device is operative to display the test information whereby the test information is provided for display on the display device upon connection of the communication to the terminating unit.

18. The system of claim 16, wherein the first network element is further operative to continue the processing of the communication pursuant to the call processing instructions so as to route the communication with the test information through the telecommunications network to a calling line connected to computer, whereby the test information is provided to the computer upon connection of the communication to the computer.

19. The system of claim 16, wherein the test information comprises a plurality of types of test information; and wherein the second network element is operative, prior to obtaining the test information, to determine a type of test information to be obtained from amongst the plurality of types of test information, and then to obtain the type of test information as the test information.

20. The system of claim 19, wherein the second network element is operative to determine the type of test information to be obtained by interacting with the first network element to obtain the type of test information from the communication.

21. The system of claim 20, wherein the second network element interacts with the first network element by instructing the first network element to play an announcement to the communication announcing the plurality of types of test information;

to receive a signal from the communication with the signal indicating the type of test information from amongst the plurality of types of test information, and to provide the signal to the second network element; and wherein the second network element, in response to receipt of the signal from the first network element, uses the signal to obtain the type of test information as the test information.

22. The system of claim 16, wherein the second network element is operative to associate the test information with the communication by associating the test information with the communication in place of the test indicator.

* * * * *